United States Patent Office 2,705,049
Patented Mar. 29, 1955

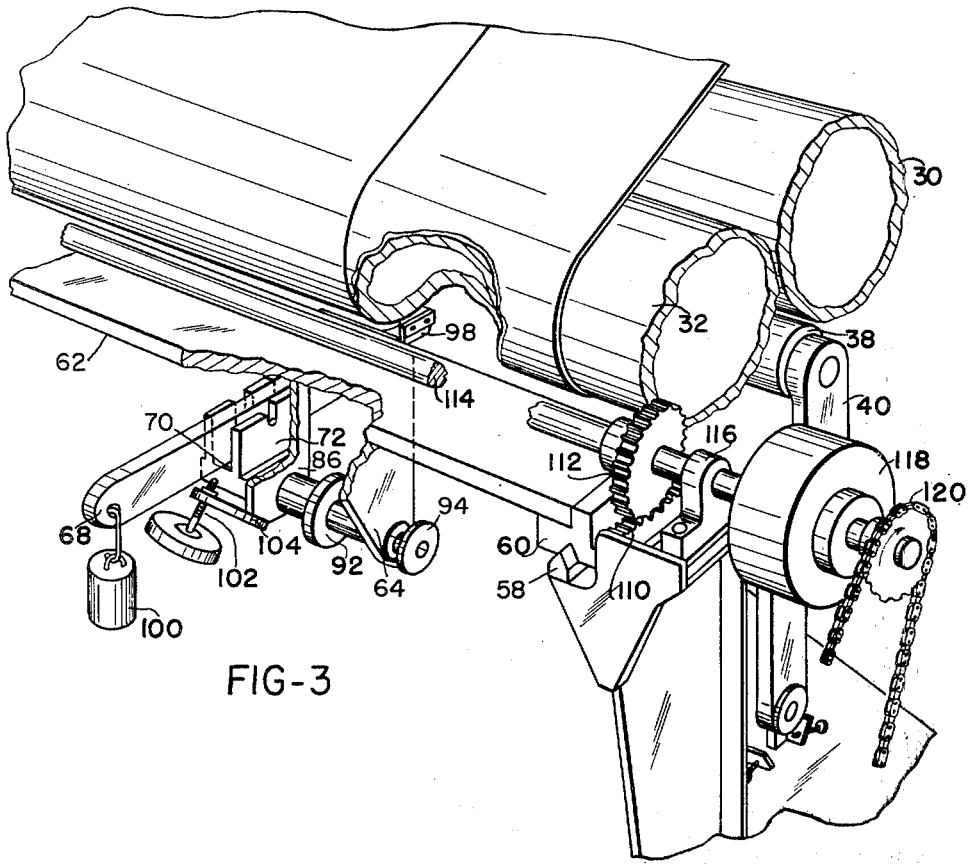
FIG-3
FIG-4
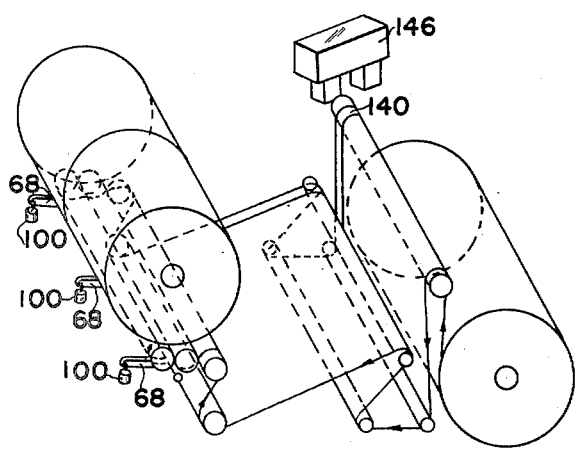
INVENTOR
HAROLD H. BROOKS
BY Toulmin & Toulmin
ATTORNEYS INVENTOR
HAROLD H. BROOKS
BY Toulmin & Toulmin
ATTORNEYS

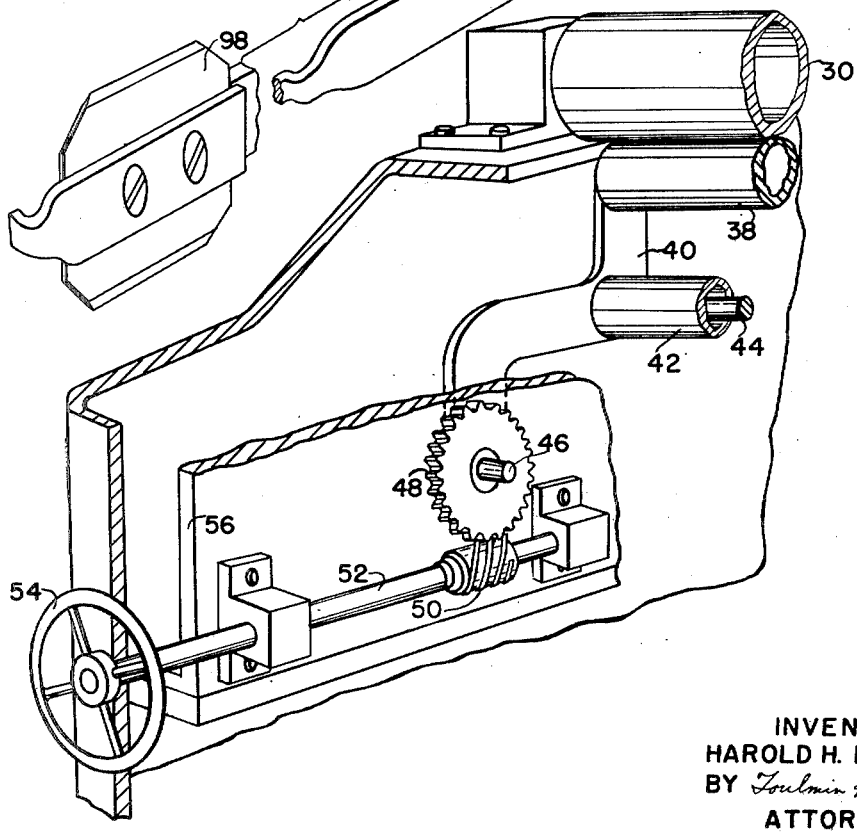

2,705,049

METHOD AND APPARATUS FOR CUTTING WEBS BY CUTTING MEMBERS MOVING IN THE DIRECTION OF THEIR CUTTING EDGES

Harold H. Brooks, Columbus, Ohio, assignor to Columbus Coated Fabrics Corporation, Columbus, Ohio, a corporation of Ohio Application September 5, 1951, Serial No. 245,100

14 Claims. (Cl. 164—17)

This invention relates to a method and apparatus for slitting webs, such as wallpaper, oilcloth, and the like.

In the manufacture of web material, such as wallpaper and oilcloth, and similar webs, it is many times more convenient to manufacture the web relatively wide and then to trim the web down to the size desired, splitting the web, if necessary, into two or more parts. This arrangement permits the trimming off of the outer edges to remove portions that may have been damaged or become soiled during the manufacturing process, and also permits more rapid manufacture by running a plurality of widths through the process at one and the same time.

Heretofore the trimming and slitting of webs in the manner described has been attended with certain difficulties, mainly due to the web tending to travel to one side or the other relative to the slitting and trimming knives, and due to the tendency for the slitting and trimming knives to become dull.

One of the objects of my invention is to provide a razor blade slitting device to get a much cleaner, sharper trim than has been gotten in the past because the trimming knives of the past were thick with a beveled edge and operated under pressure against a steel roll and the result was a rougher, somewhat mashed cut, with the edges of the cut showing a bevel like the heavy trimming wheels. The razor blade cut gives an edge approximately vertical to the surface of the goods because of the narrow, sharp blade whereas the trimming wheel or knife as used in the past gives a beveled, rough cut.

A particular object is the provision of a method and apparatus for slitting webs in which the position of the web transversely relative to the slitting knives is closely regulated at all times, thereby insuring that the web will be trimmed and slit along the exact line desired.

Another object is the provision of a method and apparatus in connection with slitting and trimming webs wherein the slitting knives always present a sharp surface to the web being slit, so that there is no tearing or rough cutting of the web.

Another object is the provision in a web slitting device of the nature referred to of a very inexpensive and readily replaceable slitting knife.

A still further object is the provision of a web slitting arrangement including a plurality of slitting knives, wherein the knives are individually adjustable to determine the exact lines along which the web will be slit.

A still further object is the provision of an improved arrangement of a web slitting machine of the nature described in which the web can be threaded through in a quite simple manner.

These and other objects and advantages will become more apparent upon reference to the following description taken in connection with the accompanying drawings, in which:

Figure 3 is a perspective view showing the arrangement of one of the slitting knives;

Figure 4 is a perspective view showing diagrammatically the manner in which the web being slit passes through the machine;

Figure 7 is a perspective view showing one of the knife arrangements;

Fig. 8 shows in perspective one of the slitting blades and the holder bar therefor; and Figure 9 is a fragmentary perspective view showing the adjustable support for an idler roll by means of which the roll can be adjusted to an inoperative position during threading of the web through the machine.

Figure 1:
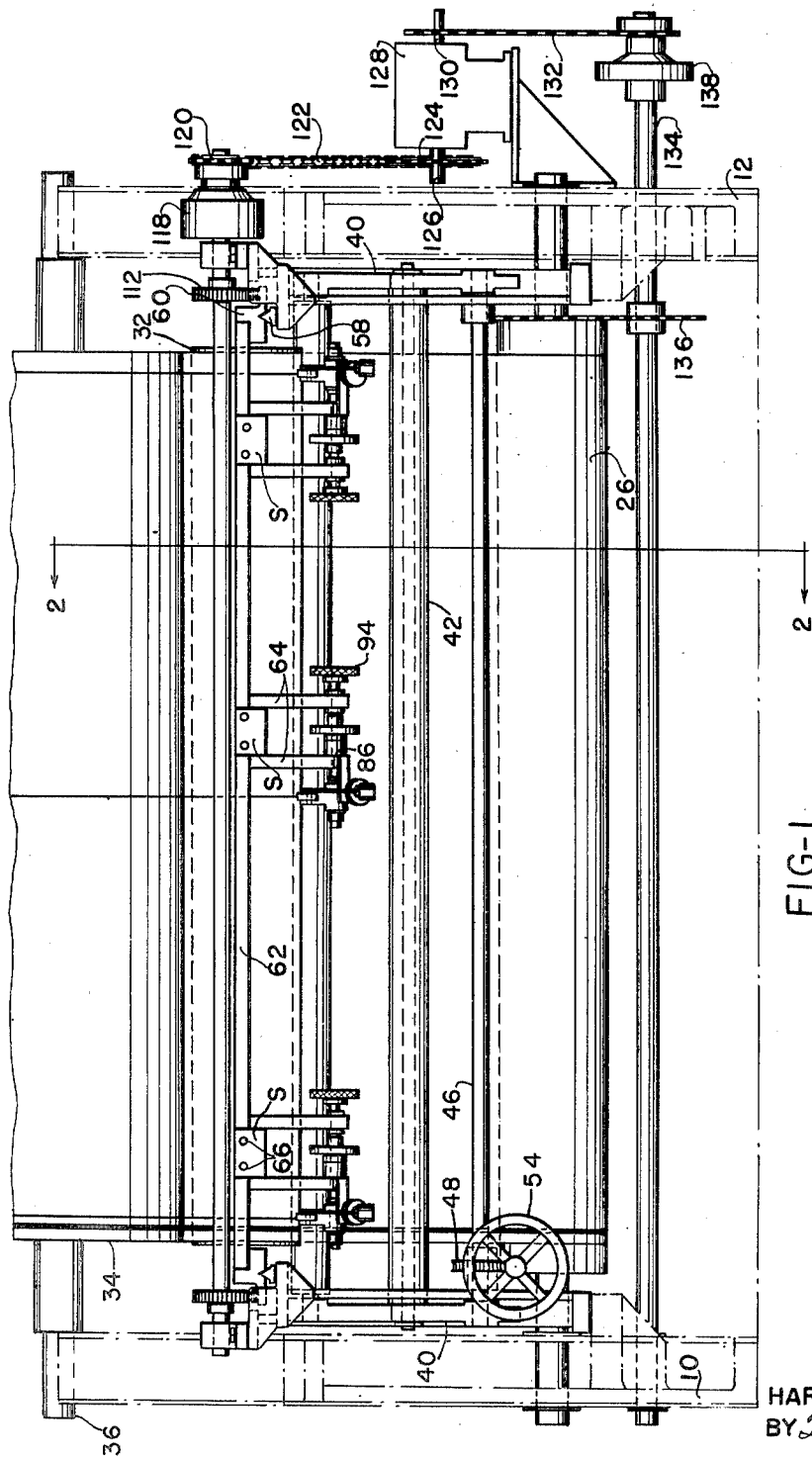
Figure 1 is a front elevational view of a machine for slitting webs according to this invention.
Figure 2:
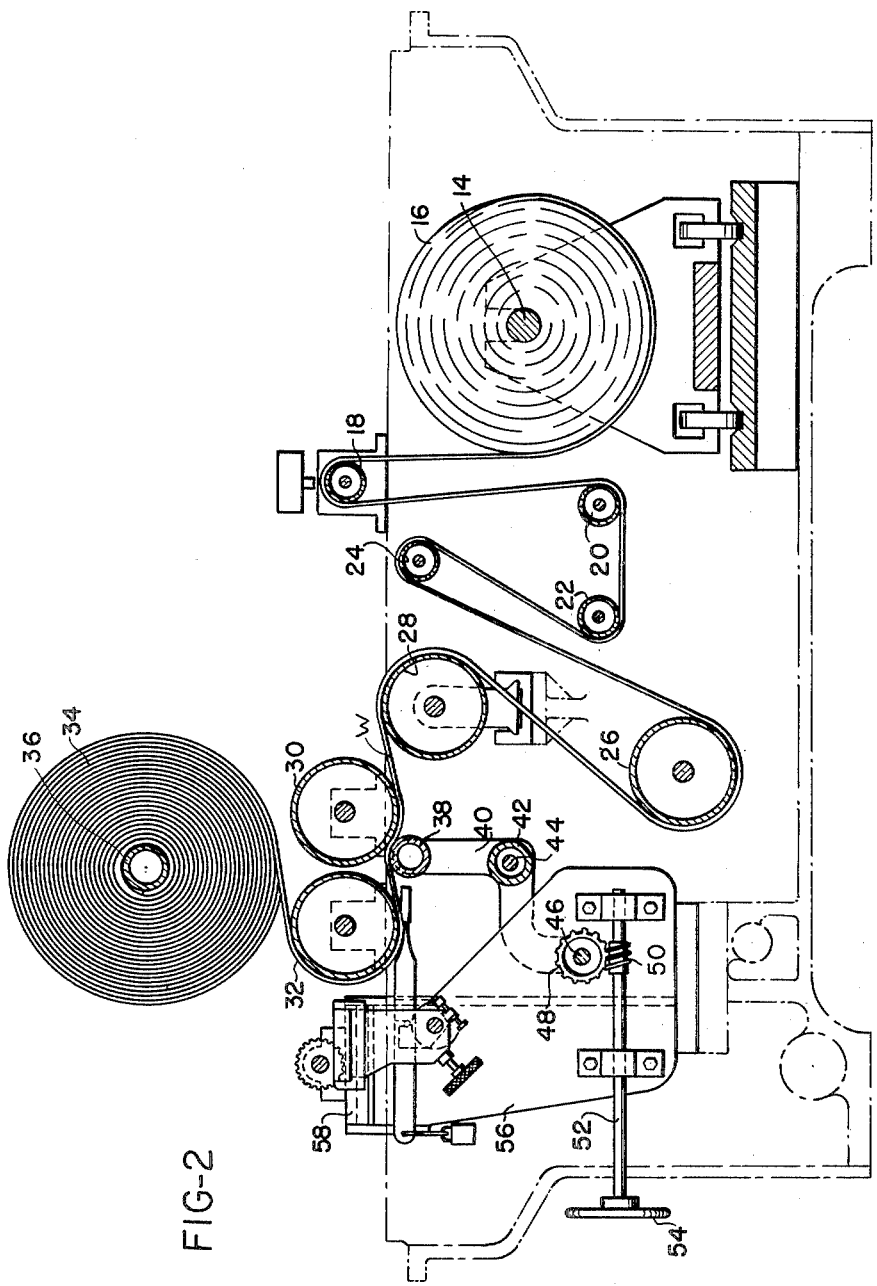
Figure 2 is a longitudinal section through the machine, indicated by line 2—2 on Figure 1.
Figure 6:
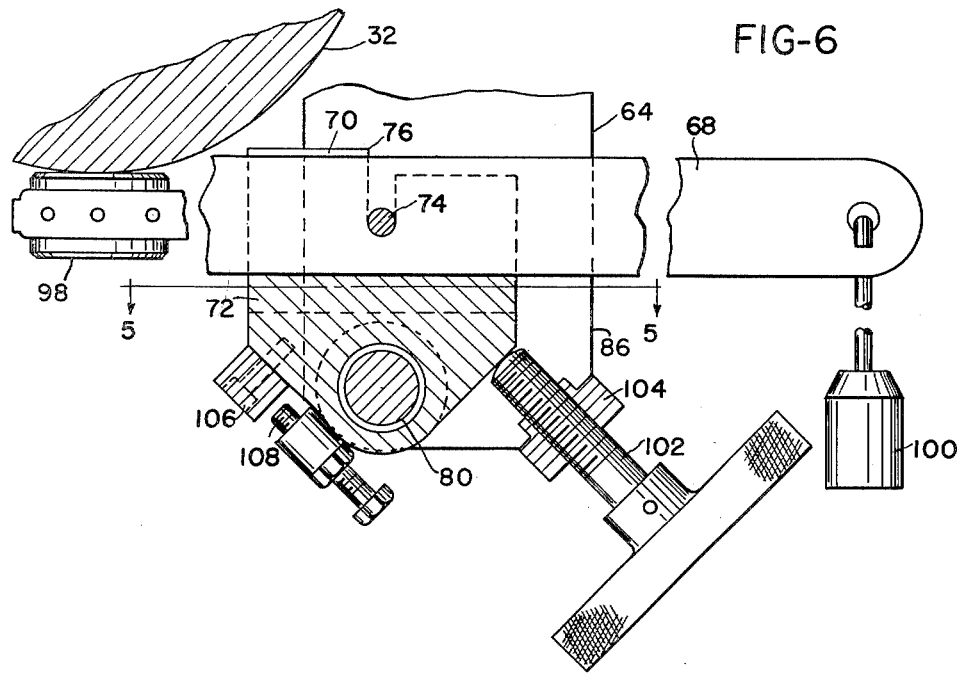
Figure 6 is a sectional view indicated by line 6—6 on Figure 5.

Referring to the drawings somewhat more in detail, the trimming and slitting machine of the present invention comprises a frame including the spaced side members 10 and 12, shown in phantom outline in Figures 1 and 2, and between which is rotatably supported the shaft 14 adapted for carrying a supply roll 16. The web from the supply roll passes over a plurality of relatively small idler rollers 18, 20, 22, and 24, rotatably supported in the machine frame, and also passes over a pair of larger idler rollers 26 and 28.

After leaving roller 28, the web, which is identified by the letter W, passes beneath the spaced relatively large idler rolls 30 and 32, and then is taken up on roll 34 carried by shaft 36. Roll 34 is driven in any suitable manner.

Disposed between and beneath rollers 30 and 32 is a smaller transversely extending idler roller 38 mounted on the upper ends of a pair of spaced arms 40 that are connected by the spacing sleeve 42 and bolt 44, and which have their lower ends mounted on the shaft 46. Shaft 46 also carries a worm wheel 48 engaged by a worm 50 on shaft 52 having a hand wheel 54 at the front of the machine.

It will be apparent that rotation of hand wheel 54 will cause rocking of arms 40 to move idler rollers 38 downwardly away from rollers 30 and 32, thereby to permit threading of web W through the machine.

Inside the frame members 10 and 12 at each side of the machine there are mounted the brackets 56 and at their upper ends brackets 56 comprise the longitudinally extending V-ways 58. Each V-way 58 is engaged by a V-block 60, and the said V-blocks are interconnected by a transversely extending plate 62.

Plate 62 provides support at spaced points therealong for the slitter bar support assemblies, identified by the letter S.

Each of the slitter bar support assemblies comprises an inverted U-shaped bracket 64 bolted at its upper end, as by cap screws 66, to bar 62, and providing means at its lower end for receiving the support shaft for the slitter bar holder. This construction will be best seen in Figures 3, 5, 6, and 7, wherein it will be observed that each slitter bar 68 rests in a slot 70 in a support block 72.

Each bar comprises a pin 74 receivable in a slot 76 so the bar is held against longitudinal movement in the block.

Each block 72 includes bearings 78 by means of which it is journaled on its support shaft 80. A collar 82 is pinned to the shaft on one side of the block and a collar 84 is adjustably secured to the shaft on the other side of the block.

Figure 5:
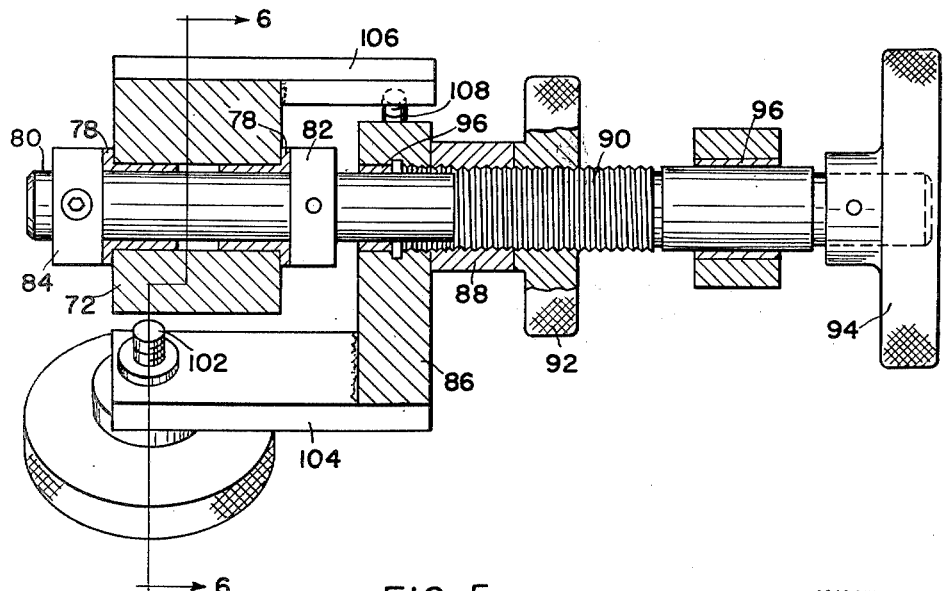
Figure 5 is a transverse sectional view taken through one of the support shafts that holds one of the slitting knives.

The supporting bracket 64 has one of its legs 86 as best shown in Figure 5, provided with a boss 88 which is threaded for receiving the threaded portion 90 of the shaft 80. A lock nut 92 provides means for locking the shaft in any desired position of adjustment in the supporting bracket and a hand wheel 94 may be provided for adjusting the said shaft. To provide accurate support for the shaft in its supporting bracket, there may be provided the spaced bearings 96 in the legs of the bracket.

Each of the slitter bars 68 is arranged to support at its one end a sharpened blade, such as the razor blade indicated at 98. As will be seen in Figures 2, 3, and 6, this blade is adapted for being positioned with its cutting edge in engagement with web W beneath roller 32. In order to hold the blade against the web with sufficient force to slit the web, each bar includes a weight 100 suspended from the end opposite the cutting blade. To prevent the blades from bearing against the surface of the roller 32 with sufficient force to dull the edge thereof, each of the blocks 72 is abutted by an adjustable screw 102 threaded through a bar 104 rigidly secured to leg 86 of the support bracket.

To prevent the holder bars and their supporting blocks from tilting beyond a predetermined point should the weights 100 be removed for any reason, each of the said blocks includes a stop bar 106 adapted for abutment on adjustable stop screw 108 carried by leg 86 of the associated support bracket.

In order continuously to present a sharp cutting edge to the web being threaded and slit, the slitter bar supporting assemblies are movable in the direction of the lengths of blades 98 during movement of the web through the machine. This is accomplished by providing the V-blocks 60 with racks 110 that are engaged by gears 112 mounted on a shaft 114 extending transversely of the machine and journaled in the bearings 116 mounted on the upper ends of the brackets 56 which comprise the slitter frame. The one end of shaft 114 is connected through an overrunning clutch 118 with a sprocket 120 connected by chain 122 with a sprocket 124 on output shaft 126 of a geared speed reducer 128.

The input shaft 130 of the reducer is connected by a chain 132 with a shaft 134 extending transversely of the machine, and which is chain driven, as by chain 136, by idler roller 26. Arranged between chain 132 and shaft 134 is a slip clutch 138.

In order to maintain the web aligned properly in the machine, the web is preferably provided with a printed guide strip, as indicated at 140 in Figure 4. This guide strip is adapted for being scanned by photocell means mounted in a control box 146 located above the web. Means under the control of the photocell means hold the web in a predetermined position laterally of the machine.

In operation, a web is threaded through the machine, and the idler roller 38 is moved to its proper position by adjustment of hand wheel 54. Each of the slitting knives is adjusted laterally so as to cut along the proper line, and all of the knives are adjusted inwardly to their Figure 2 position.

The machine is then set in operation with the web adjusted to its proper position laterally of the machine. Driving of the web causes rotation of idler roller 26, and this, in turn, drives through chain 136, shaft 134, slip clutch 138, chain 132, speed reducer 128, chain 122, and overrunning clutch 118 to shaft 114. Shaft 114 drives through gear 112 into V-blocks 60, and this drives the slitting knives leftwardly from their Figure 2 position, thus to present a sharp surface to the web at each slitting blade.

The speed reducer 128 provides a high gear reduction and in a practical arrangement, a 1740:1 reduction has been found suitable for moving the slitter blades so that a substantial length of web, say up to 2400 feet, can be cut by a single blade of only 3 or 4 inches in length.

On account of the fact that the slitter blades always present a sharp surface to the web being trimmed and slit, the said web can be moved quite rapidly and speeds of 1,000 feet per minute of the web can be had.

It will be apparent that the arrangement of this invention permits easy replacement of the slitter blades, and, inasmuch as these are conventional razor blades of a certain type, it is quite inexpensive to renew the blades.

During operation of the machine, the slip clutch 138 prevents breakage of the driving mechanism should the slitter frames be stopped for any reason, such as reaching the limit of their adjustment during operation of the machine. Also, the overrunning clutch 118 permits backward movement of the web through the machine without effecting the setting of the slitter blades, so that even if it becomes necessary to run the web backwardly in the machine, a sharp edge will be presented by each blade when the web is again driven forwardly.

It will be understood that this invention is susceptible to modification in order to adapt it to different usages and conditions, and, accordingly, it is desired to comprehend such modifications within this invention as may fall within the scope of the appended claims.

I claim:

1. In a web cutting device of the nature described; means providing support for pay-off and take-up rolls with the web to be cut extending therebetween, a roller over which the web passes between said rolls, a cutting member bearing on the web at said roller comprising a straight sharpened edge extending tangentially of the roller, and means for effecting slow continuous movement of said cutting member in one direction parallel to the direction of the said cutting edge thereof during movement of said web over said roller.

2. In a web cutting device of the nature described; a frame, means for supporting a pay-off roll in the frame, a roller in the frame over which the web passes from said pay-off roller, a cutting blade having a straight sharpened edge bearing on the surface of the web at said roller with the said cutting edge tangential to the roller, and means for driving said cutting blade slowly in the direction of its said cutting edge during movement of the web, said means comprising a driving connection extending from said web to said cutting blade and driving the blade continuously in one direction during continued movement of the web in one direction.

3. In a web cutting device of the nature described; a frame, means for supporting a pay-off in the frame, a roller in the frame over which the web passes from said pay-off rollers, a cutting blade having a straight sharpened edge bearing on the surface of the web at said roller with the said edge tangential to said roller, and means for driving said cutting blade slowly in one direction only parallel to said cutting edge during continued movement of the web, said means comprising a driving connection extending from said web to said cutting blade, said driving connection including a speed reducer.

4. In a web cutting device of the nature described; a frame, means for supporting a pay-off roll in the frame, a roller in the frame over which the web passes from said pay-off roller, a sharpened cutting blade bearing on the surface of the web at said roller with its cutting edge tangential to said roller, and means comprising a one-way driving connection extending from said web to said cutting blade, said driving connection including a speed reducer and an overrunning clutch and being operable to effect slow movement of said blade during movement of said web over said roller.

5. In a web cutting device of the nature described; a frame, a roller in said frame over which a web to be cut is moved, a sharpened knife blade bearing on the web at said roller with its cutting edge tangential to said roller, means in the frame supporting and guiding the knife blade for movement therein parallel to said cutting edge, a rack on said means extending parallel to said cutting edge, and pinion means engaging said rack and connected for being driven at reduced speed by said web, whereby said knife blade moves continuously and slowly in one direction during the movement of said web.

6. In a web cutting device of the nature described; a frame, a roller in said frame over which a web to be cut is moved, a sharpened knife blade bearing on the web at said roller with its cutting edge tangential to said roller, means in the frame supporting and guiding the knife blade for movement therein parallel to said cutting edge, a rack on said means parallel to said cutting edge, and pinion means engaging said rack and connected for being driven at reduced speed by said web, whereby said knife blade moves slowly and continuously during the movement of said web, there being a slip clutch in connection to said pinion means for permitting halting of the knife blade at the limit of its travel during continued movement of the web.

7. In a web cutting device; a frame, means in the frame for supporting a roll of the nature to be cut, an idler roller in the frame over which the web leading from the roll passes, a plurality of cutting blades spaced along the said roller and bearing on the web with their cutting edges tangential to the said roller, a common supporting member for supporting said cutting blades in said frame, means slidably supporting said member for movement in the frame in the direction of the cutting edges on said blades, and a driving connection extending from said web to said member to drive said frame in one direction during movement of said web through said device.

8. In a web cutting device; a frame, means in the frame for supporting a roll to be cut, an idler roller in the frame over which the web leading from the roll passes, a plurality of cutting blades spaced along the said roller and bearing on the web with their cutting edges tangential to said roller, a common supporting member for supporting said cutting blades in said frame, means slidably supporting and guiding said member for movement in the frame in the direction of the cutting edges on said blades, a second idler in said frame over which the web passes and which is therefore driven by movement of the web, and a one-way driving connection including speed reducing means extending from said second idler to said member, said driving connection including an overrunning clutch, whereby during movement of said web said supporting member and cutting blades will move continuously in the direction of the cutting edges of said blades.

9. In a web cutting device; a frame, means in the frame for supporting a roll to be cut, an idler roller in the frame over which the web leading from the roll passes, a plurality of cutting blades spaced along the said roller and bearing on the web with their cutting edges tangential to said roller, a common supporting member for supporting said cutting blades in said frame, means slidably supporting and guiding said member for movement in the frame in the direction of the cutting edges on said blades, a second idler in said frame over which the web passes and which is therefore driven by movement of the web, and a one-way driving connection including speed reducing means extending from said second idler to said member, whereby during movement of said web said supporting member and said cutting blades will move continuously in the direction of the cutting edges of said blade, said driving connection including a slip clutch and an overrunning clutch.

10. In a web cutting device; a frame, means in the frame for supporting a roll of material to be cut, an idler roller over which the web to be cut passes, a plurality of cutting means spaced along said roller including cutting blades bearing on the web with their cutting edges tangential to the roller, a member in said frame common to said cutting means for supporting the same, means slidably supporting and guiding said member in the frame for movement in the direction of the cutting edges of said blades, racks on opposite ends of said member extending in the said direction of movement thereof, gears engaging said racks, a shaft journaled in the frame mounting said gears, a second idler in the frame engaged by the web and therefore driven thereby, and one-way drive means including speed reducing means drivingly connecting said second idler with said shaft.

11. A method of cutting a web of material comprising; moving the web along an arcuate path, engaging the web along said arcuate path with a cutting member having its sharpened edge tangential to the web, and moving the cutting member slowly and continuously in one direction in the direction of the sharpened edge thereof during continued movement of the web.

12. A method of cutting a web of material comprising; moving the web along an arcuate path, engaging the web along said arcuate path with a cutting member having its sharpened edge tangential to the web, and moving the cutting member continuously in one direction in the direction of the sharpened edge thereof during continued movement of the web, the movement of the cutting member being in the same direction as the web moves but at a reduced rate.

13. The method of cutting a web so as to carry out trimming and slitting operations thereon comprising; moving the web along an arcuate path and supporting the web, engaging the web along its arcuate path by a cutting member having a sharpened edge thereon tangential to said web, and moving the cutting member continuously in one direction during continued movement of the web and in the same direction as the web but at reduced speed.

14. The method of trimming and slitting a web comprising; moving the web along an arcuate path and supporting the web, engaging the web at spaced points therealong by cutting members having sharpened cutting edges, and moving the cutting members in unison in one direction in the direction of their cutting edges during continued movement of the web.

References Cited in the file of this patent

UNITED STATES PATENTS

| Number | Name | Date |
|---|---|---|
| 324,155 | Parsons | Aug. 11, 1885 |
| 910,325 | Sill | Jan. 19, 1909 |
| 1,116,795 | Camerol et al. | Nov. 10, 1914 |
| 1,177,146 | Sheehan | Mar. 28, 1916 |
| 1,186,906 | Hopkins | June 13, 1916 |
| 1,465,966 | Cameron et al. | Aug. 28, 1923 |
| 1,730,196 | De Pamphilis | Oct. 1, 1929 |
| 1,798,806 | Pfeiffer | Mar. 31, 1931 |
| 1,839,383 | Erpelding | Jan. 5, 1932 |
| 1,896,375 | Roesen | Feb. 7, 1933 |
| 2,034,662 | McLaughlin et al. | Mar. 17, 1936 |
| 2,078,669 | King | Apr. 27, 1937 |
| 2,117,878 | Friedemann | May 17, 1938 |
| 2,173,931 | Broughton | Sept. 26, 1939 |
| 2,199,648 | Parkhurst | May 7, 1940 |
| 2,489,153 | Rahe | Nov. 22, 1949 |

FOREIGN PATENTS

| Number | Country | Date |
|---|---|---|
| 484,402 | Great Britain | May 2, 1938 |